(12) United States Patent
Takahashi et al.

(10) Patent No.: US 8,176,190 B2
(45) Date of Patent: May 8, 2012

(54) RECORD MEDIUM BEARING COMMUNICATION APPARATUS CONTROL PROGRAM, AND COMMUNICATION APPARATUS

(75) Inventors: Satoru Takahashi, Kawasaki (JP); Takao Mohri, Kawasaki (JP); Yuji Wada, Kawasaki (JP); Hideki Mitsunobu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 650 days.

(21) Appl. No.: 12/036,655

(22) Filed: Feb. 25, 2008

(65) Prior Publication Data
US 2008/0204921 A1  Aug. 28, 2008

(30) Foreign Application Priority Data
Feb. 27, 2007 (JP) ................. 2007-047339

(51) Int. Cl.
*G11B 15/18* (2006.01)
(52) U.S. Cl. ........ 709/230; 709/203; 709/208; 709/223; 709/224
(58) Field of Classification Search .................. 709/230, 709/203, 223, 224, 227, 237, 245, 208; 370/241, 370/244, 245, 248, 252, 236, 346, 449, 439
See application file for complete search history.

(56) References Cited

U.S. PATENT DOCUMENTS

| 5,933,604 | A  | * | 8/1999  | Inakoshi ....................... 709/226 |
| 7,136,928 | B2 | * | 11/2006 | Saito et al. .................... 709/230 |
| 7,447,761 | B1 | * | 11/2008 | Ferguson et al. ............. 709/224 |
| 7,626,937 | B2 | * | 12/2009 | Chen et al. .................... 370/241 |
| 7,693,934 | B2 | * | 4/2010  | Jung et al. .................... 709/203 |
| 2006/0235956 | A1 | * | 10/2006 | Kawaguchi et al. .......... 709/223 |

FOREIGN PATENT DOCUMENTS
JP   2004-318852   11/2004
* cited by examiner

*Primary Examiner* — Wing Chan
*Assistant Examiner* — Ruolei Zong
(74) *Attorney, Agent, or Firm* — Staas & Halsey LLP

(57) ABSTRACT

A computer performs a control including (1) receiving a request for monitoring a station to-be-handled which is a communication apparatus different from a pertinent station including the computer, (2) transmitting a request for a response based on the station to-be-handled, to the station to-be-handled at a predetermined time interval, on the basis of the monitoring request, and (3) transmitting a message expressing that the station to-be-handled will be detached from a network, to the network if the response to the response request was not received within a predetermined wait time.

7 Claims, 16 Drawing Sheets

FIG. 3
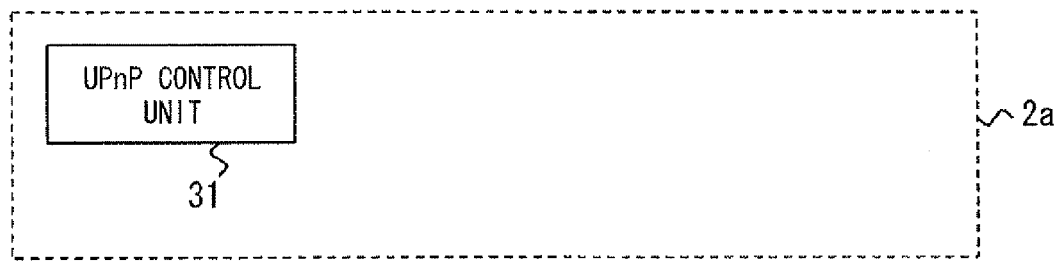
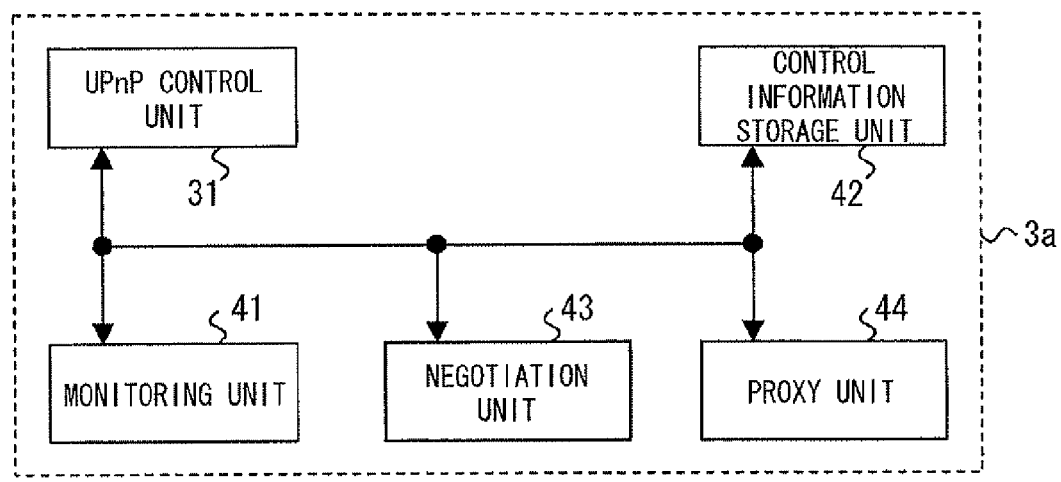
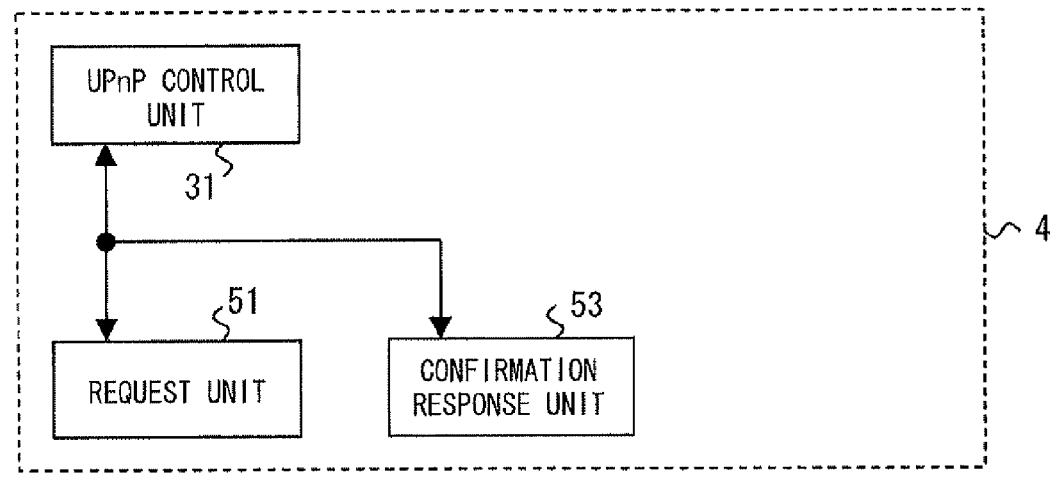

FIG. 4

STABILITY INFORMATION A

| POWER SUPPLY | AC ADAPTER |
|---|---|
| BATTERY REMAINING CAPACITY | N/A |
| NETWORK INTERFACE | ETHERNET |
| RADIO WAVE INTENSITY | N/A |
| CPU POWER | 3.2GHz |
| MEMORY | 1.0GB |

STABILITY INFORMATION B

| POWER SUPPLY | BATTERY |
|---|---|
| BATTERY REMAINING CAPACITY | 30Wh |
| NETWORK INTERFACE | WIRELESS LAN |
| RADIO WAVE INTENSITY | −60dB |
| CPU POWER | 1.4GHz |
| MEMORY | 512MB |

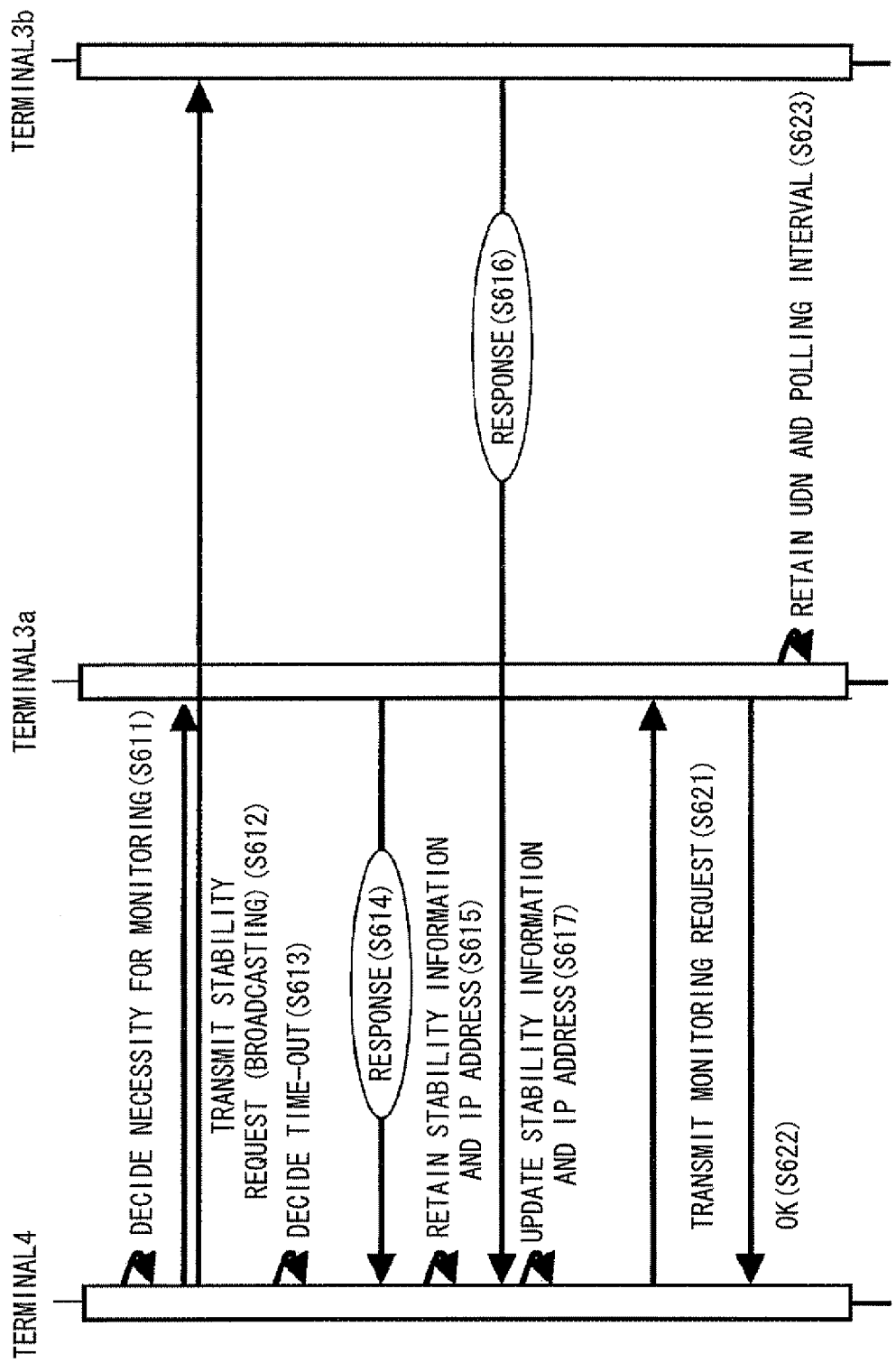

RECORD MEDIUM BEARING COMMUNICATION APPARATUS CONTROL PROGRAM, AND COMMUNICATION APPARATUS

BACKGROUND

1. Technical Field

The present invention relates to a communication apparatus control program and a communication apparatus which notify another communication apparatus that a communication apparatus to be handled is connected to a network.

2. Description of the Related Art

A ubiquitous environment requires a scheme which cooperates with services and equipments that subsist in a particular place. At present, notice is taken of the UPnP (Universal Plug and Play) as standard technology for the cooperation.

Here, the operation of UPnP equipment will be described.

First, the existence notification (ALIVE) of the UPnP equipment will be explained. Here, the UPnP equipment which is to be handled shall be called "UPnP equipment to-be-handled". A network to which the UPnP equipment to-be-handled is connected shall be called "network to-be-handled".

During the connection of the UPnP equipment to-be-handled to the network to-be-handled, the UPnP equipment to-be-handled transmits the existence notification to the network to-be-handled by multicasting. The notification indicates the existence of itself to other UPnP equipment located within the network to-be-handled.

The existence notification bears an available term. Besides, the UPnP equipment to-be-handled transmits the existence notification again before the available term expires. The other UPnP equipment, having received the existence notification, regards the UPnP equipment to-be-handled as existing within the available term. The other UPnP equipment regards the UPnP equipment to-be-handled as having gone out of existence upon the expiration of the available term.

Next, the stop notification (BYEBYE) of the UPnP equipment will be explained. When the UPnP equipment to-be-handled is to be detached from the network to-be-handled, it transmits the stop notification by multicasting to the network to-be-handled. The other UPnP equipment having received the stop notification regards the UPnP equipment to-be-handled as having gone out of existence, even when the available term remains.

Incidentally, as a related-art technique relevant to the Embodiments, there has been a network apparatus wherein individual devices within a network manage the information items of the devices found out one another, as a list. The information items are shared by notifying disconnection from the network and the like changes, among the devices, so as to periodically confirm the existences of the devices (refer to, for example, JP-A-2004-318852).

However, the existence/stop notifications of the UPnP are not interlocked with the connection/detachment to and from the network. Therefore, when the UPnP equipment to-be-handled is detached without sending the stop notification, the other UPnP equipment regards the UPnP equipment to-be-handled as existing, until the available term expires. In a case, for example, where the UPnP equipment to-be-handled connected to the network by radio communications, and UPnP equipment to-be-handled goes out of the area of the radio communications, it is detached from the network without sending the stop notification. Besides, the ordinary available term is set at, for example, 30 minutes. In this case, the other UPnP equipment regards the UPnP equipment to-be-handled as existing, for at most 30 minutes.

With the related-art technique mentioned above, all the devices monitor one another at all times, so that the load of all the UPnP equipments is heavy. If the UPnP equipment to-be-handled is battery-driven, the operating time period of the UPnP equipment to-be-handled shortens when the loads of a CPU and the radio communications are increased.

SUMMARY OF THE INVENTION

The invention has been made in order to solve the problem mentioned above, and it has for its object to provide a communication apparatus control program and a communication apparatus in which, when a communication apparatus to-be-handled is detached from a network, another equipment located within the network can promptly recognize the detachment.

In a typical aspect of performance of the present invention, a computer receives a request for the monitoring of a station to-be-handled which is a communication apparatus different from the station of the computer, it transmits requests for responses by the station to-be-handled, to the station to-be-handled at predetermined time intervals on the basis of the monitoring request, and it transmits a message expressing that the station to-be-handled is detached from a network, to the network if it has failed to receive the response to the response request, within a predetermined wait time.

The above-described embodiments of the present invention are intended as examples, and all embodiments of the present invention are not limited to including the features described above.

BRIEF DESCRIPTION OF THE DRAWINGS

FIG. 3 is a block diagram showing an example of the software configurations of the UPnP terminals according to Embodiment 1;

FIG. 4 is a table showing an example of stability information items which are stored in a control information storage unit according to Embodiment 1;

FIG. 16 is a sequence diagram showing an example of request processing according to Embodiment 2.

DETAILED DESCRIPTION OF THE PREFERRED EMBODIMENTS

Figure 1:
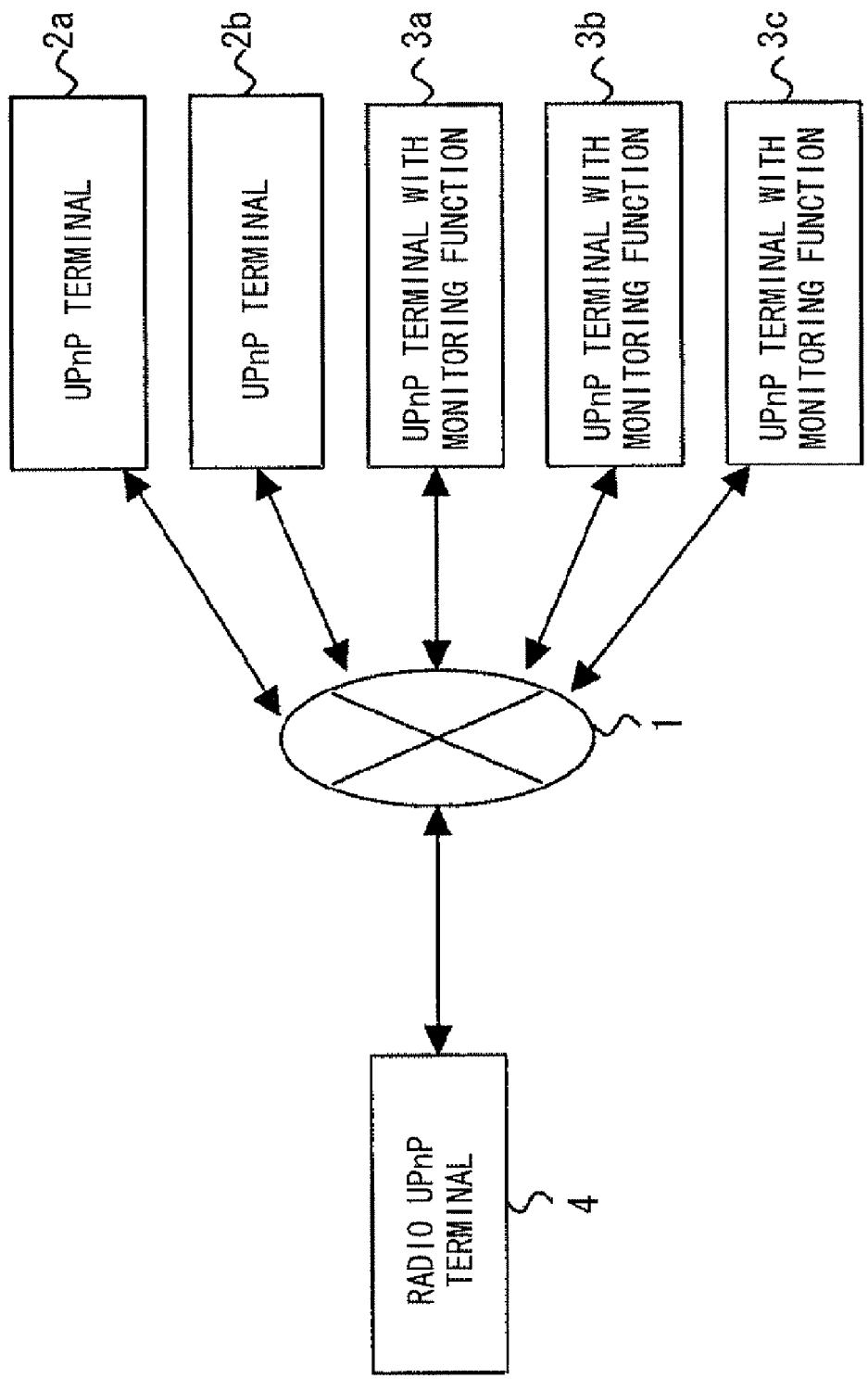
FIG. 1 is a block diagram showing an example of the configuration of a UPnP communication system according to Embodiment 1 of the present invention.

Reference may now be made in detail to embodiments of the present invention, examples of which are illustrated in the accompanying drawings, wherein like reference numerals refer to like elements throughout.

Embodiment 1

Now, an embodiment of the invention will be described with reference to the drawings.

The embodiment will be described on a UPnP communication system to which the communication apparatus of the invention is applied.

First, the configuration of the UPnP communication system according to the embodiment will be described.

FIG. 1 is a block diagram showing an example of the configuration of the UPnP communication system according to the embodiment. The UPnP communication system is configured of UPnP terminals 2a, 2b, 3a, 3b and 3c which are connected to a network 1, and a radio UPnP terminal 4 which is radio-connected to the network 1 and which might be detached from the network 1. The UPnP terminals 2a, 2b, 3a, 3b and 3c are servers, PCs (Personal Computers) or the likes. Among them, the UPnP terminals 3a, 3b and 3c are UPnP terminals with a monitoring function as can monitor the radio UPnP terminal 4. The radio UPnP terminal 4 is a mobile radio communication apparatus such as portable telephone, PDA (Personal Digital Assistant), notebook type PC or car navigation system.

Figure 2:
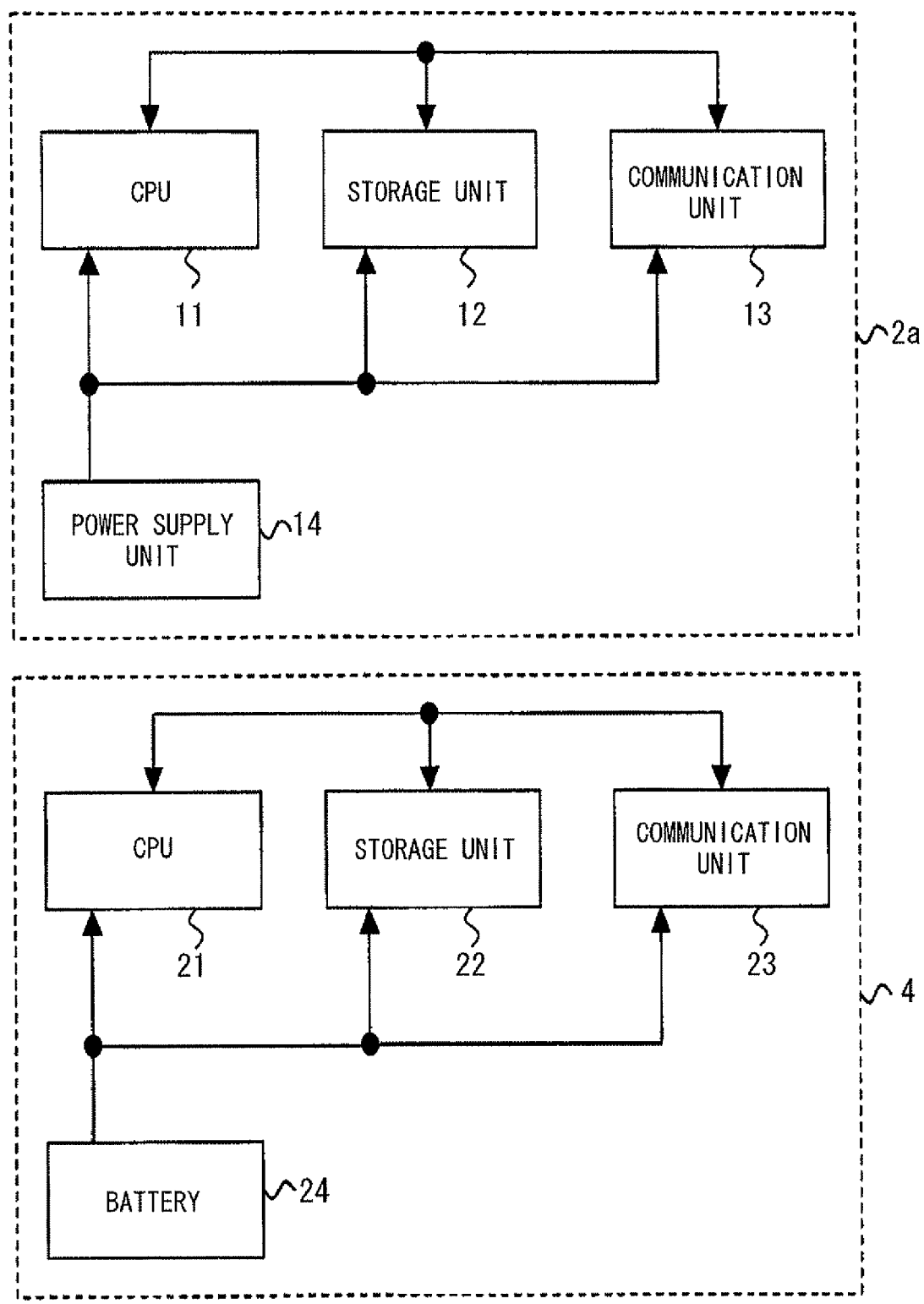
FIG. 2 is a block diagram showing an example of the hardware configurations of UPnP terminals according to Embodiment 1.

FIG. 2 is a block diagram showing an example of the hardware configurations of the UPnP terminals according to the embodiment. The hardware of the UPnP terminal 2a includes a CPU 11, a storage unit 12, a communication unit 13 and a power supply unit 14. The hardware configuration of each of the UPnP terminals 2b, 3a, 3b and 3c is similar to that of the UPnP terminal 2a. The CPU 11 performs the controls of the individual units by using software and data stored in the storage unit 12. The communication unit 13 communicates with the network 1 in compliance with an instruction from the CPU 11. The power supply unit 14 feeds power to the individual units.

The hardware of the radio UPnP terminal 4 includes a CPU 21, a storage unit 22, a radio communication unit 23 and a battery 24. The CPU 21 performs the controls of the individual units by using software and data stored in the storage unit 22. The communication unit 23 communicates with the network 1 in compliance with an instruction from the CPU 21. The battery 24 feeds power to the individual units.

FIG. 3 is a block diagram showing an example of the software configurations of the UPnP terminals according to the embodiment. The software which is stored in each of the storage units 12 of the UPnP terminals 2a and 2b and which is operated by the CPU 11 includes a UPnP control unit 31.

The software of each of the UPnP terminals 3a, 3b and 3c with the monitoring function includes a monitoring unit 41, a control information storage unit 42, a negotiation unit 43 and a proxy unit 44, in addition to the software configuration of the UPnP terminal 2a or 2b. The software which is stored in the storage unit 22 of the radio UPnP terminal 4 and which is operated by the CPU 21, includes a request unit 51 and a confirmation response unit 53, in addition to the software configuration of the UPnP terminal 2a or 2b.

Next, the control information storage unit 42 will be described.

FIG. 4 is a table showing an example of stability information which is stored in the control information storage unit according to the embodiment. The stability information (adaptation information) is structural data, the members of which are the parameters of the sort of a power supply for driving the UPnP terminal, a battery remaining capacity [Wh] in the case where the power supply is the battery, the network interface of the UPnP terminal, a radio wave intensity [dB] received or transmitted by the UPnP terminal, the CPU Power [Hz] (processing capability) of the UPnP terminal, and the capacity [Byte] (storage capacity) of Memory which the UPnP terminal can use. Which of the UPnP terminals with the monitoring function has a high stability can be decided using such stability information. The UPnP terminal with the monitoring function which has been decided to have the highest stability is endowed with a qualification (representation right) for monitoring the radio UPnP terminal.

The stability information A in FIG. 4 is the stability information stored in the control information storage unit 42 of the UPnP terminal with the monitoring function, 3a. In the stability information A, the power supply is an AC adapter, the battery remaining capacity is N/A (Not Available), the network interface is the Ethernet (a registered trademark), the radio wave intensity is N/A, the CPU Power is 3.2 GHz, and the Memory is 1.0 GB. Besides, the stability information B is the stability information stored in the control information storage unit 42 of the UPnP terminal with the monitoring function, 3b. In the stability information B, the power supply is the battery, the battery remaining capacity is 30 Wh, the network interface is Wireless LAN, the radio wave intensity is –60 dB, the CPU Power is 1.4 GHz, and the Memory is 512 MB.

In the power supply, the AC adapter is judged to be higher in stability than the battery. In the network interface, the Ethernet is judged to be higher in stability than the Wireless LAN. Each of the battery remaining capacity, the radio wave intensity, the CPU Power, and the Memory is judged to be higher in stability as its value is larger.

Next, the operation of the UPnP communication system according to the embodiment will be described.

First, the UPnP terminals with the monitoring function, 3a, 3b and 3c execute a representation right negotiation process. A representation right for monitoring the radio UPnP terminal 4 is set in any of the UPnP terminals with the monitoring function, 3a, 3b and 3c, by negotiations during the representation right negotiation process. The representation right negotiation process in the embodiment is periodically executed without regard to whether a monitoring request has been received from the radio UPnP terminal 4. The interval of the representation right negotiation process is, for example, one hour. The representation right negotiation process sets the terminal of the highest stability among the UPnP terminals with the monitoring function, as a representative terminal. In the embodiment, the expression "stability" indicates the state of the communications of the terminal in the network 1, and the stability of the terminal is judged higher as the communications of the terminal is more stable.

Besides, when the communications of the radio UPnP terminal 4 with the network 1 become unstable, this radio UPnP terminal 4 executes request processing in which it makes the request for the monitoring of itself to the representative terminal that is the terminal having the representation right. The representative terminal monitors the connection situation of the radio UPnP terminal 4 to the network 1 when the request processing is executed. The representative terminal executes a monitoring process in which it transmits a BYEBYE message indicating the detachment of the radio UPnP terminal 4, in place of the radio UPnP terminal 4 if the radio UPnP terminal 4 has been detached from the network 1.

Next, the representation right negotiation process will be described.

The corresponding negotiation unit 43 transmits a request for stability information when the UPnP terminal with the monitoring function, 3a, 3b or 3c is started. The request for stability information contains the stability information of its own stored in the control information storage unit 42, periodically to the other UPnP terminals with the monitoring function.

Figure 5:
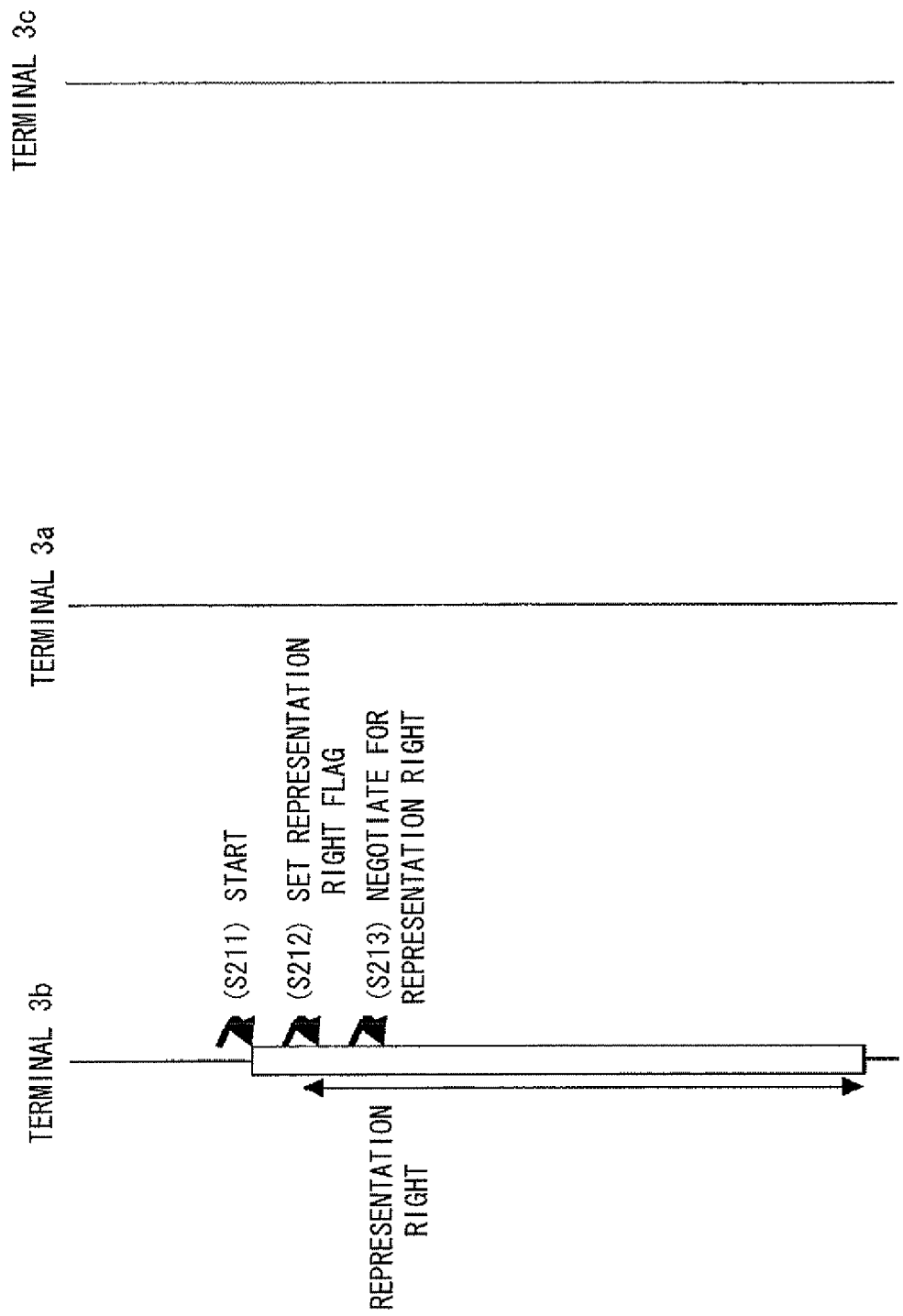
FIG. 5 is a sequence diagram showing a first state in a representation right negotiation process according to Embodiment 1.

FIG. 5 is a sequence diagram showing a first state in the representation right negotiation process according to the embodiment. FIG. 5 shows the operations of the UPnP terminals with the monitoring function, 3a, 3b and 3c. First, the UPnP terminals with the monitoring function, 3a, 3b and 3c are assumed to be in a state where they are not started. Besides, the UPnP terminals with the monitoring function, 3a, 3b and 3c are assumed to be higher in stability in this order. Subsequently, the UPnP terminal with the monitoring function, 3b is started (S211) and sets a representation right flag in the control information storage unit 42 (S212). The UPnP terminal 3b negotiates for the representation right (S213). After the start, each of the UPnP terminals with the monitoring function executes the setting of the representation right flag and the negotiation for the representation right every predetermined representation right setting interval. Here, no other UPnP terminal with the monitoring function is started, and the UPnP terminal 3b with the monitoring function ends the negotiation for the representation right.

Figure 6:
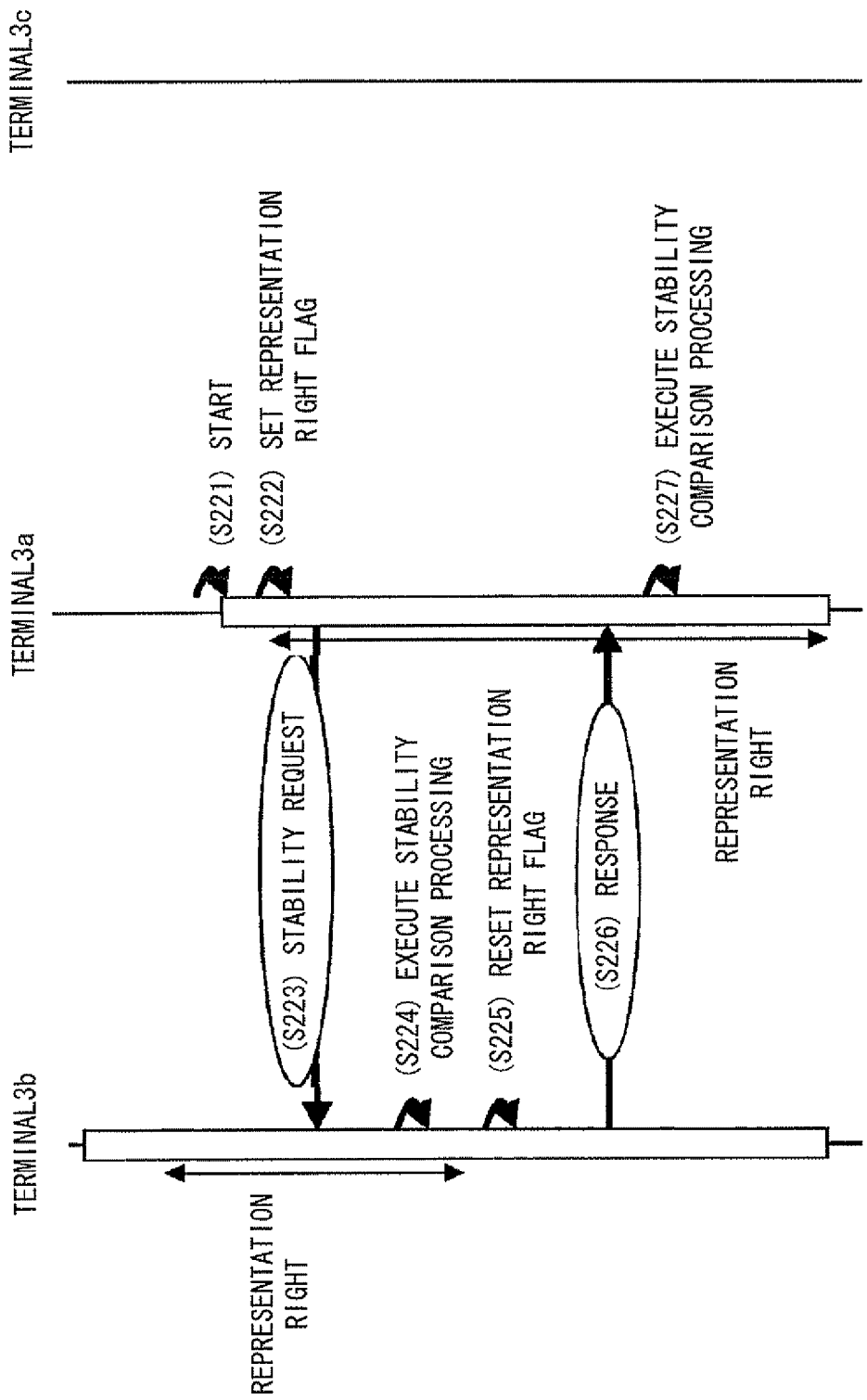
FIG. 6 is a sequence diagram showing a second state in the representation right negotiation process according to Embodiment 1.

FIG. 6 is a sequence diagram showing a second state in the representation right negotiation process according to the embodiment. FIG. 6 shows operations after the first state explained above. Subsequently when the UPnP terminal with the monitoring function, 3a is started (S221), it sets the representation right flag in the control information storage unit 42 (S222), and it negotiates for the representation right (S223).

Here, the UPnP terminal with the monitoring function, 3a transmits a stability information request containing the stability information of its own to the UPnP terminal with the monitoring function, 3b. The UPnP terminal with the monitoring function, 3b having received the stability information request from the UPnP terminal with the monitoring function, 3a executes stability comparison process in which the stability information of its own and the stability information of the UPnP terminal with the monitoring function, 3a are compared (S224). In this example, the UPnP terminal with the monitoring function, 3b decides that the stability of its own is lower, as the result of the stability comparison process. Therefore, the UPnP terminal with the monitoring function, 3b resets the representation right flag (S225), and it transmits a response containing the stability information of its own, to the UPnP terminal with the monitoring function, 3a (S226).

The UPnP terminal with the monitoring function, 3a having received the response from the UPnP terminal with the monitoring function, 3b executes a stability comparison process in which the stability information of its own and the stability information of the UPnP terminal with the monitoring function, 3b are compared (S277). In this example, the UPnP terminal with the monitoring function, 3a decides that the stability of its own is higher, as the result of the stability comparison process, and hence, it maintains the representation right flag. Here, any other UPnP terminal with the monitoring function is not started, so that the UPnP terminal with the monitoring function, 3a ends the negotiation for the representation right.

Figure 7:
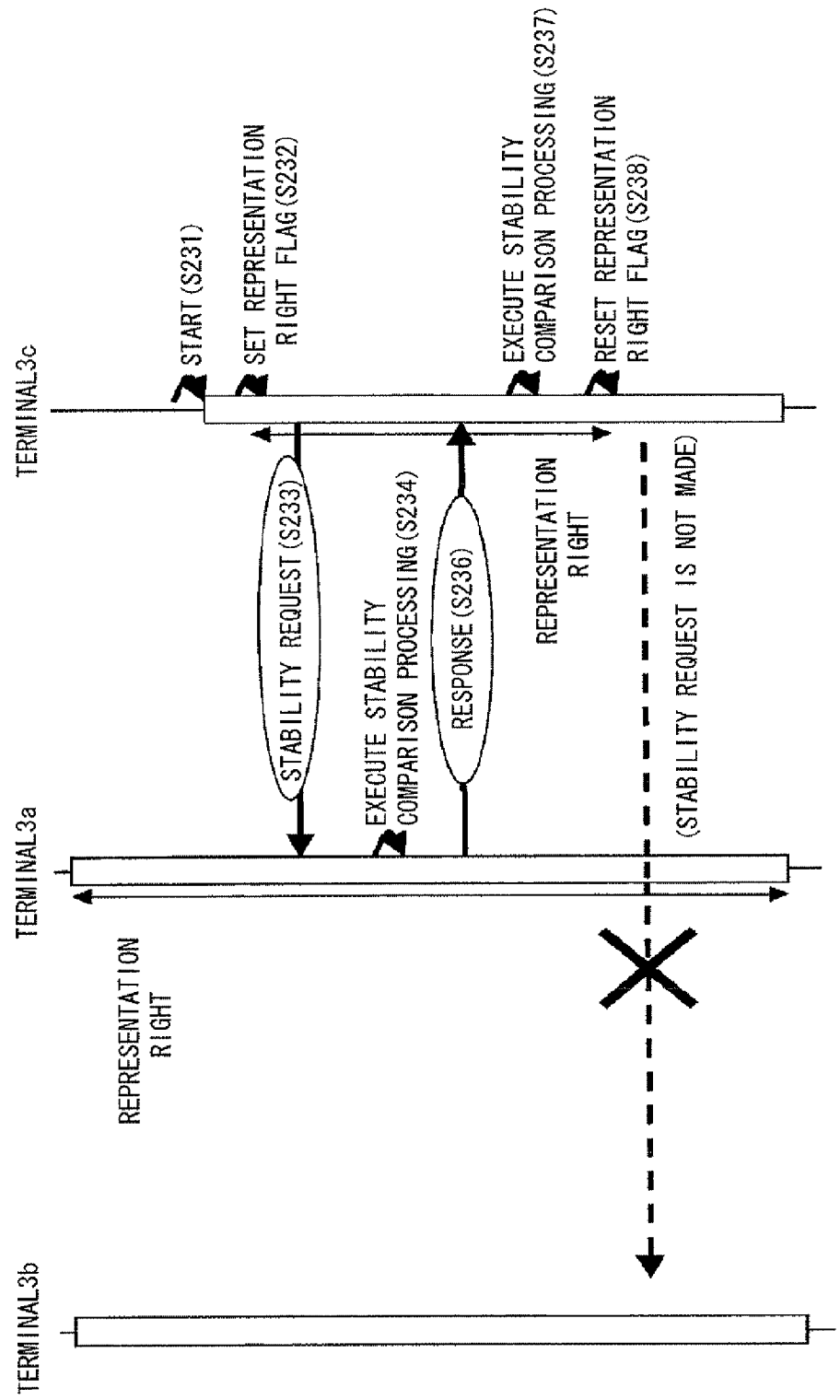
FIG. 7 is a sequence diagram showing a third state in the representation right negotiation process according to Embodiment 1.

FIG. 7 is a sequence diagram showing a third state in the representation right negotiation process according to the embodiment. FIG. 7 shows operations after the second state explained above. Subsequently, when the UPnP terminal with the monitoring function, 3c is started (S231), it sets the representation right flag in the control information storage unit 42 (S232), and it negotiates for the representation right (S233).

Here, the UPnP terminal with the monitoring function, 3c transmits a stability information request containing the stability information of its own, to the UPnP terminal with the monitoring function, 3a. The UPnP terminal with the monitoring function, 3a having received the stability information request from the UPnP terminal with the monitoring function, 3c executes a stability comparison process in which the stability information of its own and the stability information of the UPnP terminal with the monitoring function, 3c are compared (S234). In this example, the UPnP terminal with the monitoring function, 3a decides that the stability of its own is higher, as the result of the stability comparison process. Therefore, the UPnP terminal with the monitoring function, 3a maintains the representation right flag, and it transmits a response containing the stability information of its own, to the UPnP terminal with the monitoring function, 3c (S236).

The UPnP terminal with the monitoring function, 3c having received the response from the UPnP terminal with the monitoring function, 3a executes a stability comparison process in which the stability information of its own and the stability information of the UPnP terminal with the monitoring function, 3a are compared (S237). In this example, the UPnP terminal with the monitoring function, 3c decides that the stability of its own is lower, as the result of the stability comparison process, and hence, it resets the representation right flag (S238). When the UPnP terminal with the monitoring function, 3c has lost the representation right, it ends the negotiation for the representation right.

Figure 8:
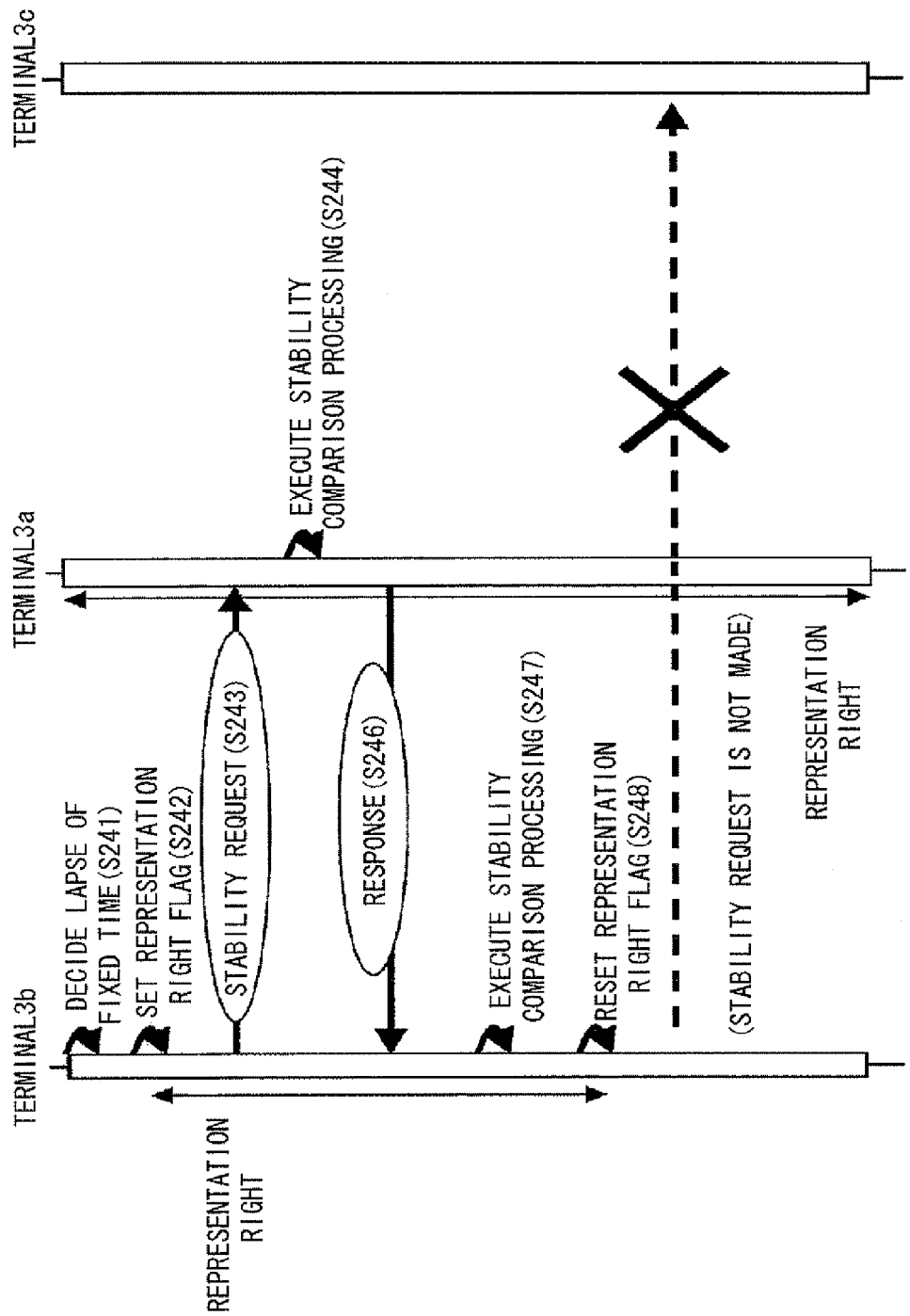
FIG. 8 is a sequence diagram showing a fourth state in the representation right negotiation process according to Embodiment 1.

FIG. 8 is a sequence diagram showing a fourth state in the representation right negotiation process according to the embodiment. FIG. 8 shows operations after the third state explained above. Subsequently, when the representation right setting interval has lapsed since the process operation 213 (S241), the UPnP terminal with the monitoring function, 3b sets the representation right flag again (S242) and negotiates for the representation right.

Here, the UPnP terminal with the monitoring function, 3b transmits a stability information request containing the stability information of its own, to the UPnP terminal with the monitoring function, 3a (S243). The UPnP terminal with the monitoring function, 3a having received the stability information request from the UPnP terminal with the monitoring function, 3b executes a stability comparison process in which the stability information of its own and the stability information of the UPnP terminal with the monitoring function, 3b are compared (S244). In this example, the UPnP terminal with the monitoring function, 3a decides that the stability of its own is higher, as the result of the stability comparison process. Therefore, the UPnP terminal with the monitoring function, 3a maintains the representation right flag, and it transmits a response containing the stability information of its own, to the UPnP terminal with the monitoring function, 3b (S246).

The UPnP terminal with the monitoring function, 3b having received the response from the UPnP terminal with the monitoring function, 3a executes a stability comparison process in which the stability information of its own and the stability information of the UPnP terminal with the monitoring function, 3a are compared (S247). In this example, the UPnP terminal with the monitoring function, 3b decides that the stability of its own is lower, as the result of the stability comparison process, and hence, it resets the representation right flag (S248). When the UPnP terminal with the monitoring function, 3b has lost the representation right, it ends the negotiation for the representation right.

Figure 9:
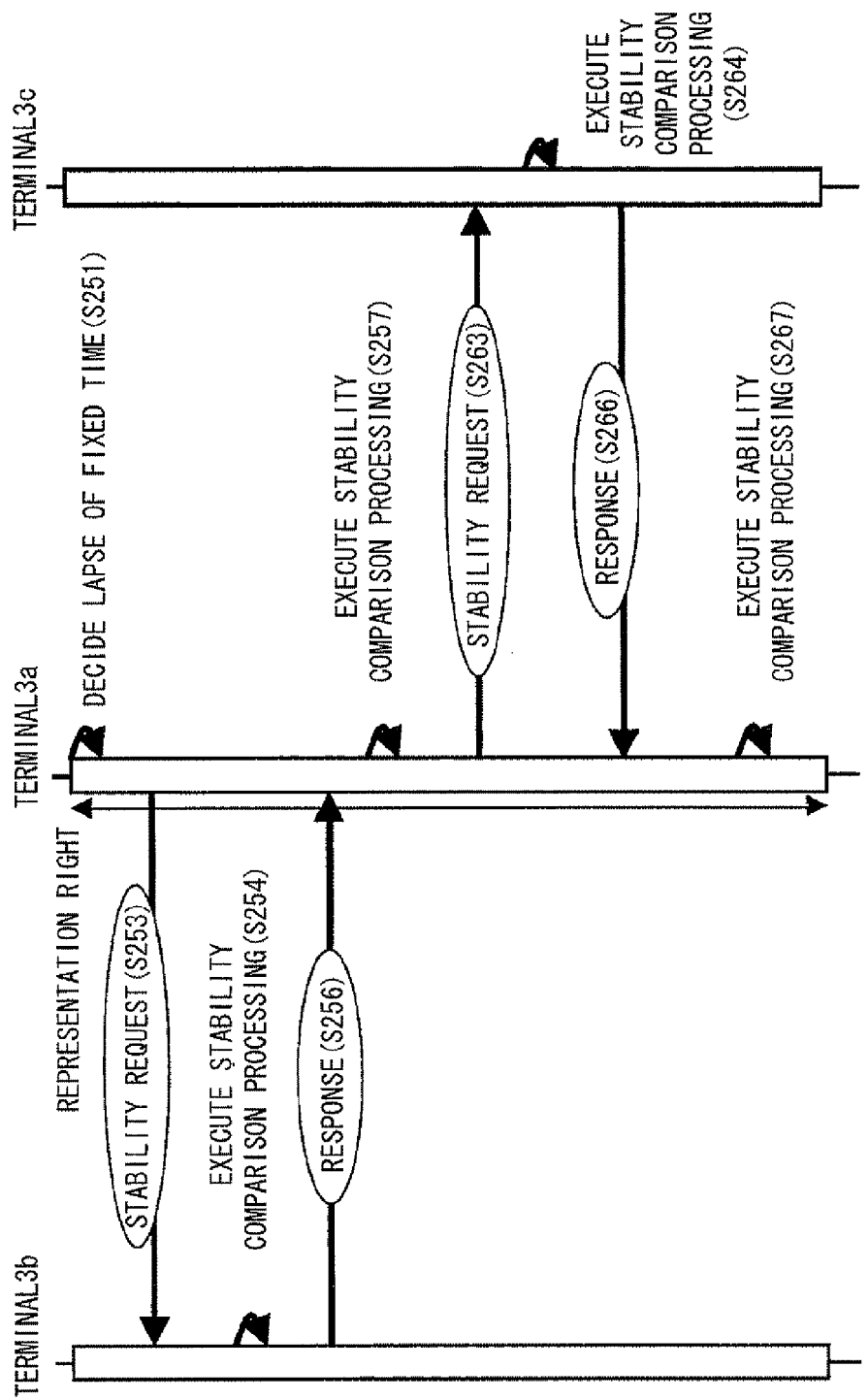
FIG. 9 is a sequence diagram showing a fifth state in the representation right negotiation process according to Embodiment 1.

FIG. 9 is a sequence diagram showing a fifth state in the representation right negotiation process according to the embodiment. FIG. 9 shows operations after the fourth state explained above. Subsequently, when the representation right setting interval has lapsed since the process operation 223 (S251), the UPnP terminal with the monitoring function, 3a negotiates for the representation right again.

Here, the UPnP terminal with the monitoring function, 3a transmits a stability information request containing the stability information of its own, to the UPnP terminal with the monitoring function, 3b (S253). The UPnP terminal with the monitoring function, 3b having received the stability information request from the UPnP terminal with the monitoring function, 3a executes a stability comparison process in which the stability information of its own and the stability information of the UPnP terminal with the monitoring function, 3a are compared (S254). In this example, the UPnP terminal with the monitoring function, 3b decides that the stability of its own is lower, as the result of the stability comparison process, and it transmits a response containing the stability information of its own, to the UPnP terminal with the monitoring function, 3a (S256).

The UPnP terminal with the monitoring function, 3a having received the response from the UPnP terminal with the monitoring function, 3b executes a stability comparison process in which the stability information of its own and the stability information of the UPnP terminal with the monitoring function, 3b are compared (S257). In this example, the UPnP terminal with the monitoring function, 3a decides that the stability of its own is higher, as the result of the stability comparison process, and hence, it maintains the representation right flag.

Subsequently, the UPnP terminal with the monitoring function, 3a transmits a stability information request containing the stability information of its own, to the UPnP terminal with the monitoring function, 3c (S263). The UPnP terminal with the monitoring function, 3c having received the stability information request from the UPnP terminal with the monitoring function, 3a executes a stability comparison process in which the stability information of its own and the stability information of the UPnP terminal with the monitoring function, 3a are compared (S264). In this example, the UPnP terminal with the monitoring function, 3c decides that the stability of its own is lower, as the result of the stability comparison process, and it transmits a response containing the stability information of its own, to the UPnP terminal with the monitoring function, 3a (S266).

The UPnP terminal with the monitoring function, 3a having received the response from the UPnP terminal with the monitoring function, 3c executes a stability comparison process in which the stability information of its own and the stability information of the UPnP terminal with the monitoring function, 3c are compared (S267). In this example, the UPnP terminal with the monitoring function, 3a decides that the stability of its own is higher, as the result of the stability comparison process, and hence, it maintains the representation right flag.

Figure 10:
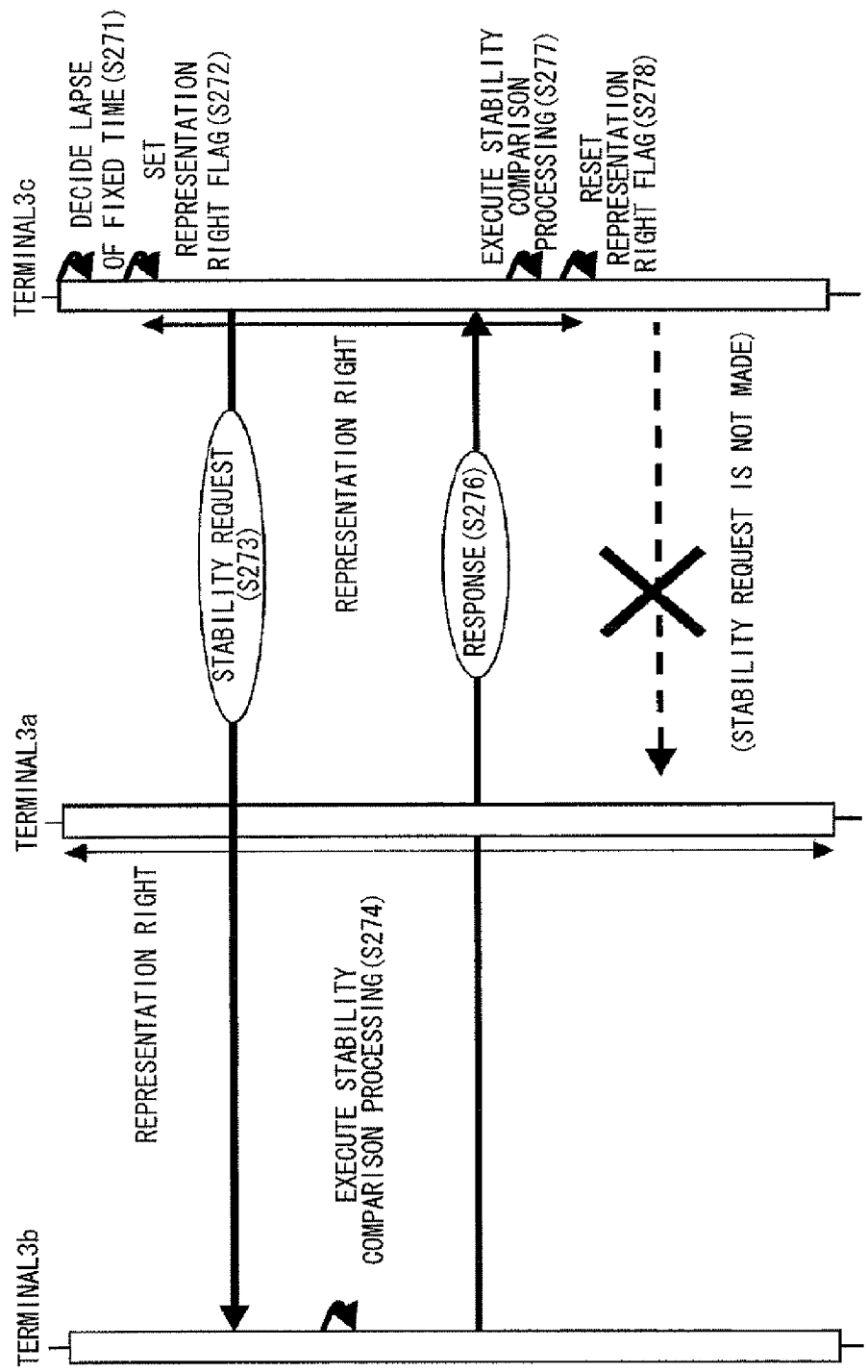
FIG. 10 is a sequence diagram showing a sixth state in the representation right negotiation process according to Embodiment 1.

FIG. 10 is a sequence diagram showing a sixth state in the representation right negotiation process according to the embodiment. FIG. 10 shows operations after the fifth state explained above. Subsequently, when the representation right setting interval has lapsed since the process operation 233 (S271), the UPnP terminal with the monitoring function, 3c sets the representation right flag again (S272) and negotiates for the representation right (S273).

Here, the UPnP terminal with the monitoring function, 3c transmits a stability information request containing the stability information of its own, to the UPnP terminal with the monitoring function, 3b. The UPnP terminal with the monitoring function, 3b having received the stability information request from the UPnP terminal with the monitoring function, 3c executes a stability comparison process in which the stability information of its own and the stability information of the UPnP terminal with the monitoring function, 3c are compared (S274). In this example, the UPnP terminal with the monitoring function, 3b decides that the stability of its own is higher, as the result of the stability comparison process, and it transmits a response containing the stability information of its own, to the UPnP terminal with the monitoring function, 3c (S276). If the UPnP terminal with the monitoring function, 3b does not have the representation right, it does not alter the representation right flag without regard to the result of the stability comparison process.

The UPnP terminal with the monitoring function, 3c having received the response from the UPnP terminal with the monitoring function, 3b executes stability a comparison process in which the stability information of its own and the stability information of the UPnP terminal with the monitoring function, 3b are compared (S277). In this example, the UPnP terminal with the monitoring function, 3c decides that the stability of its own is lower, as the result of the stability comparison process, and hence, it resets the representation right flag (S278). When the UPnP terminal with the monitoring function, 3b has lost the representation right, it ends the negotiation for the representation right.

In accordance with the representation right negotiation process, one of the UPnP terminals with the monitoring function, 3a, 3b and 3c can be set as the representative terminal.

Incidentally, a predetermined one of the UPnP terminals with the monitoring function is endowed with the representation right during the representation right negotiation process, so as to be set as the representative terminal beforehand. The representative terminal transmits a stability information request to another of the UPnP terminals with the monitoring function, so as to execute a stability comparison process by using the stability information of its own and received stability information. The representative terminal uses a result of the stability comparison process to select the UPnP terminal with the monitoring function having the highest stability and to transfer the representation right to the selected UPnP terminal with the monitoring function.

Next, the stability comparison process will be described.

The stability comparison process is a process in which the negotiation unit 43 of the UPnP terminal with the monitoring function compares the stability information of its own and the stability information of another UPnP terminal with the monitoring function, so as to decide the terminal of higher stability. This stability comparison process employs any of a first stability comparison method, a second stability comparison method and a third stability comparison method as explained below.

First of all, the first stability comparison method will be described. In the first stability comparison method, priority levels are set as the individual members of stability information. If a certain one of the UPnP terminals with the monitoring function (a transmission side terminal) has transmitted the stability information to another of the UPnP terminals with the monitoring function (a reception side terminal), the reception side terminal first compares the values of the members of the highest priority levels as to the stability information of the transmission side terminal and that of the reception side terminal. If the compared values of the members are different, the terminal of higher stability is outputted as the result of the comparison, whereupon the process is ended. If the values of the compared members are equal, the values of the members of the second highest priority levels are compared. The reception side executes the comparisons until the result of the comparison is obtained. If the result of the comparison has not been obtained even by the comparisons of the values of all the members, that one of the transmission side terminal and the reception side terminal whose IP address is younger is decided as the terminal of higher stability.

Here, it is assumed that the individual members are arrayed in accordance with the priority levels by using the stability information items in FIG. 4. It is also assumed that the UPnP terminal with the monitoring function, 3b having the stability information B has received the stability information A of the UPnP terminal with the monitoring function, 3a. The UPnP terminal with the monitoring function, 3b compares the values of the members of the highest priority levels as to the stability information A and the stability information B. Here, the UPnP terminal with the monitoring function, 3b decides that, since the AC adapter is higher in stability than the battery, the UPnP terminal with the monitoring function, 3a is higher in stability than the UPnP terminal with the monitoring function, 3b.

Next, the second stability comparison method will be described. In the second stability comparison method, if a certain one of the UPnP terminals with the monitoring function (a transmission side terminal) has transmitted the stability information to another of the UPnP terminals with the monitoring function (a reception side terminal), the reception side terminal compares the values of individual members as to the stability information items of the transmission side terminal and the reception side terminal, and it stores the results of the comparisons of the respective members. Subsequently, the reception side terminal decides the terminal which is larger in the number of the members decided to be higher in stability, in the results of the comparisons, as the terminal of higher stability. If the numbers of such members are equal, the reception side terminal decides that one of the transmission side terminal and the reception side terminal whose IP address is younger, as the terminal of the higher stability.

Here, using the stability information items in FIG. 4, it is assumed that the UPnP terminal with the monitoring function, 3b having the stability information B has received the stability information A of the UPnP terminal with the monitoring function, 3a. In the stability information A, the number of the members decided to be higher in stability is "4", while in the stability information B, the number of the members decided to be higher in stability is "0". Therefore, the UPnP terminal with the monitoring function, 3b decides that the UPnP terminal with the monitoring function, 3a is higher in stability than the terminal 3b itself. Here, the comparisons of the members whose values are "N/A" are not made.

Next, the third stability comparison method will be described. In the third stability comparison method, the respective UPnP terminals with the monitoring function calculate scores from the values of stability information items in conformity with a predetermined calculation method, and they transmit the scores to the other UPnP terminals with the monitoring function. The scores may be transmitted as numerical values, or may well be converted into bit arrays which are to be transmitted. If a certain one of the UPnP terminals with the monitoring function (a transmission side terminal) has transmitted the score to another of the UPnP terminals with the monitoring function (a reception side terminal), the reception side terminal compares the scores of the transmission side terminal and the reception side terminal, and it decides the terminal of higher score as the terminal of higher stability. If the scores are equal, the reception side terminal decides that one of the transmission side terminal and the reception side terminal whose IP address is younger, as the terminal of the higher stability.

Here, description will be made using the stability information items in FIG. 4. Each of the UPnP terminals with the monitoring function calculates the score on the basis of the values of the individual members of the stability information. Here, if the value of the power supply is the AC adapter, "200" is added to the score, and if the value of the power supply is the battery, a value based on the value of the battery remaining capacity is added to the score. By way of example, when the value of the battery remaining capacity is 30 Wh, "120" is added to the score. Besides, if the value of the network interface is the Ethernet, "200" is added to the score, and if the value of the network interface is the Wireless LAN, a value based on the value of the radio wave intensity is added to the score. By way of example, when the value of the radio wave intensity is "−60 dB", "120" is added to the score. Besides, a value based on the CPU Power is added to the score. By way of example, when the value of the CPU Power is 3.2 GHz, "160" is added to the score, and when the value of the CPU Power is 1.4 GHz, "70" is added to the score. Besides, a value based on the value of the Memory is added to the score. By way of example, when the value of the Memory is 1.0 GB, "100" is added to the score, and when the value of the Memory is 512 MB, "50" is added to the score.

In this case, the score calculated from the stability information A becomes "660", and the score calculated from the stability information B becomes "360". The UPnP terminal with the monitoring function, 3b having received the score from the UPnP terminal with the monitoring function, 3a decides that the UPnP terminal with the monitoring function, 3a is higher in stability than the terminal 3b itself, because the score of the UPnP terminal with the monitoring function, 3a is higher than that of the terminal 3b itself.

In accordance with the stability information comparison process described above, the UPnP terminal with the monitoring function can decide whether or not the stability of the terminal itself is higher than that of the other UPnP terminal with the monitoring function. Accordingly, the UPnP terminal with the monitoring function can determine whether or not the terminal itself has the representation right.

Next, request processing will be described.

Figure 11:
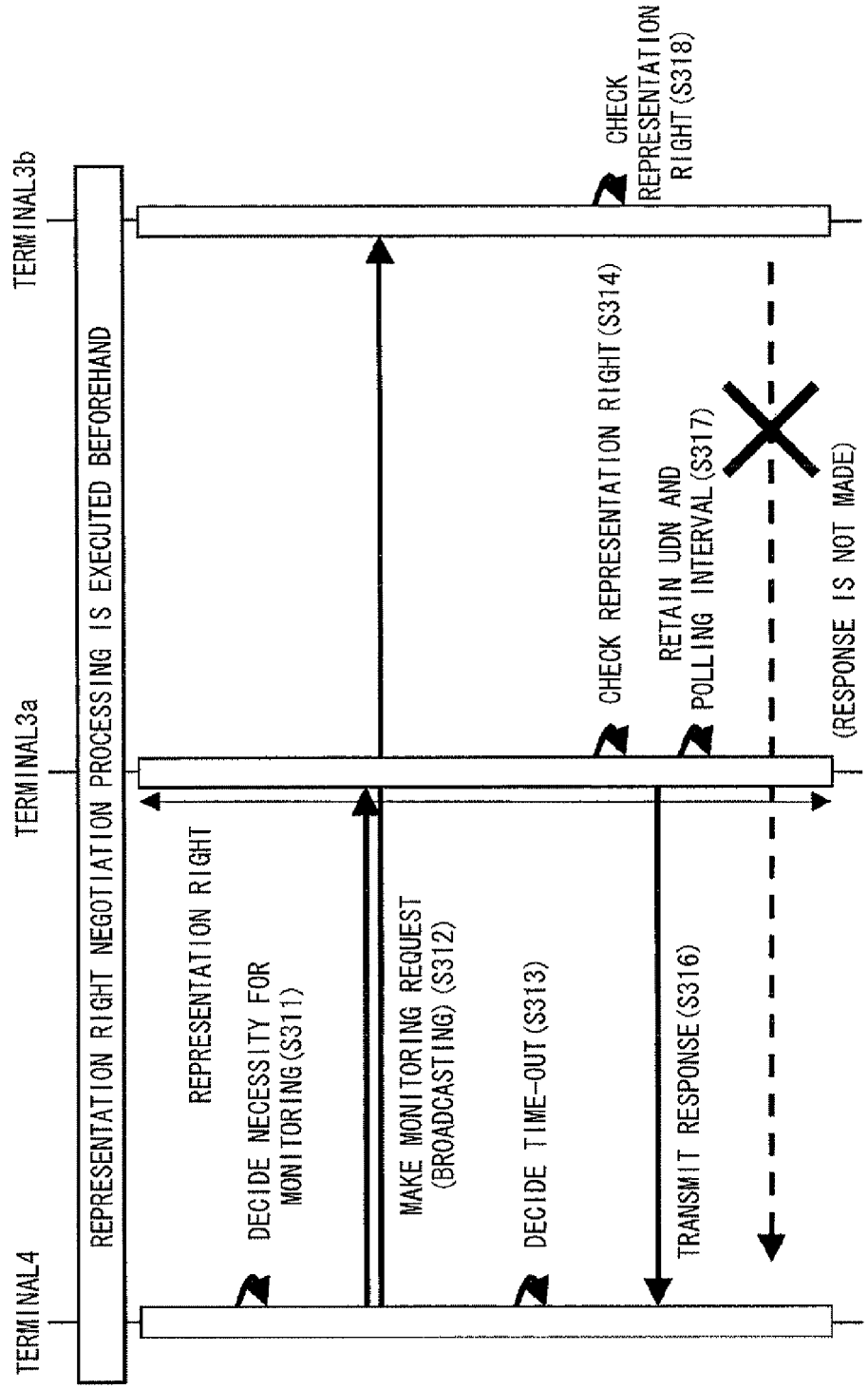
FIG. 11 is a sequence diagram showing an example of request processing according to Embodiment 1.

FIG. 11 is a sequence diagram showing an example of the request processing according to the embodiment. FIG. 11 shows the operations of the radio UPnP terminal 4, and the UPnP terminals with the monitoring function, 3*a* and 3*b*. It is assumed that the UPnP terminal with the monitoring function, 3*a* is the representative terminal. First, the request unit 51 of the radio UPnP terminal 4 decides whether or not monitoring is necessary (S311). Here, a case where the monitoring is necessary (a first condition) is a case where the communications of the radio UPnP terminal 4 (the state of a pertinent station) is unstable, so the possibility of the detachment of the pertinent station from the network 1 is high, and for example, a case where a radio wave intensity detected by the radio UPnP terminal 4 has become a predetermined value or less. Incidentally, it is also allowed to employ a parameter expressive of the state of the radio UPnP terminal 4, other than the radio wave intensity, such as a bandwidth in which the radio UPnP terminal 4 performed communications, the remaining capacity of the battery which drives the radio UPnP terminal 4, the moving speed of the radio UPnP terminal 4, or the load of the radio UPnP terminal 4, and to employ such parameters in combination.

Here, if the request unit 51 has decided that the monitoring is unnecessary, it ends the request processing. Assuming in this example that the request unit 51 has decided that the monitoring is necessary, it transmits a monitoring request for making a request for the monitoring, to the network 1 by broadcasting (S312). The monitoring request contains the UDN (Unique Device Name) of the radio UPnP terminal 4, and a polling interval. The UDN is an identifier which is peculiar to the UPnP terminal. Subsequently, the request unit 51 decides time-out (S313). Here, if the request unit 51 does not receive a response before the lapse of a predetermined time-out time period since the transmission of the monitoring request, it decides the time-out and ends the request processing.

Here, it is assumed that the UPnP terminals with the monitoring function, 3*a* and 3*b* have received the monitoring request. The UPnP terminal with the monitoring function, 3*a* checks the representation right flag of the control information storage unit 42 (S314), and since it has the representation right, it transmits the response indicating "OK", to the radio UPnP terminal 4 (S316) and retains the UDN and polling interval contained in the monitoring request, in the control information storage unit 42 (S317). Simultaneously, the UPnP terminal with the monitoring function, 3*b* checks the representation right flag of the control information storage unit 42 (S318), and it makes no response because it does not have the representation right.

In accordance with the request processing, the radio UPnP terminal 4 can request the representative terminal to monitor the terminal 4 itself, and the representative terminal can acquire the UDN and the polling interval which are required for the BYEBYE message of the request source.

Next, a monitoring process will be described.

Figure 12:
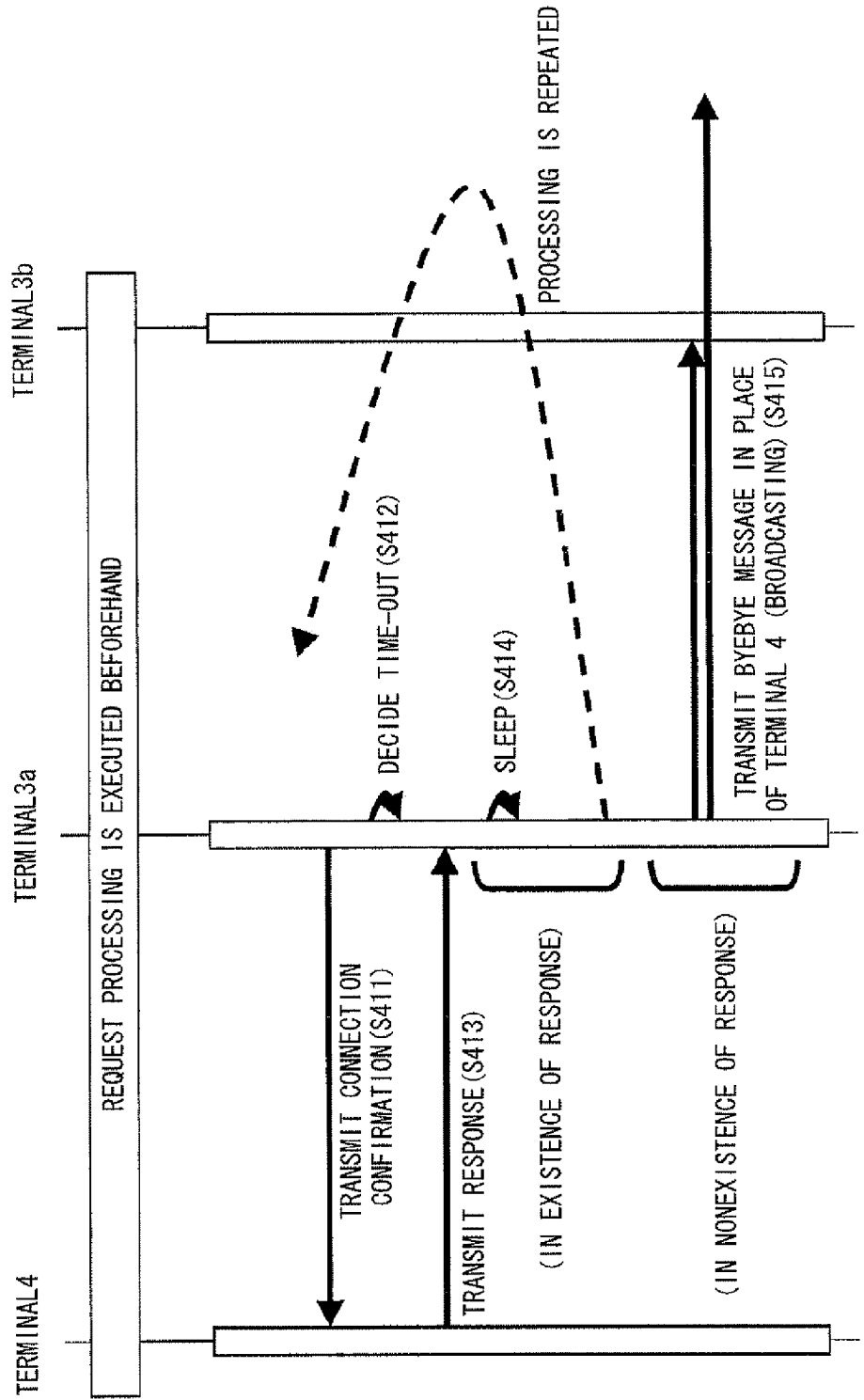
FIG. 12 is a sequence diagram showing an example of a monitoring process according to Embodiment 1.

FIG. 12 is a sequence diagram showing an example of a monitoring process according to the embodiment. FIG. 12 shows a state after the request processing described above. First, the monitoring unit 41 of the UPnP terminal with the monitoring function, 3*a* transmits a connection confirmation to the radio UPnP terminal 4 (S411). Subsequently, the monitoring unit 41 decides time-out (S412). Here, when the monitoring unit 41 does not receive a response before the lapse of a predetermined time-out time period (wait time) since the transmission of the connection confirmation, it decides the time-out and shifts to a process operation S415. Subsequently, the confirmation response unit 53 of the radio UPnP terminal 4 transmits the response to the connection confirmation, to the UPnP terminal with the monitoring function, 3*a*. When the UPnP terminal with the monitoring function, 3*a* has received the response (S413), the monitoring unit 41 acquires the polling interval retained in the control information storage unit 42 and sleeps for the polling interval (S414). Thereafter, the process is returned to the process operation S411.

If the time-out has been decided at the process operation S412, the proxy unit 44 acquires the UDN of the radio UPnP terminal 4 retained in the control information storage unit 42, it generates the BYEBYE message in place of the radio UPnP terminal 4 and transmits the message to the network 1 by broadcasting (S415), whereupon the monitoring process is ended. Incidentally, it has been assumed here that the proxy unit 44 generates the BYEBYE message of the radio UPnP terminal 4 by using the UDN of this radio UPnP terminal 4, but it is also allowed that the radio UPnP terminal 4 transmits the contents of the BYEBYE message of its own to the UPnP terminal with the monitoring function, 3*a* in the request processing, and that the UPnP terminal with the monitoring function, 3*a* transmits the contents of the BYEBYE message received from the radio UPnP terminal 4, as they are, at the process operation S415.

Further, after the request processing, the radio UPnP terminal 4 can execute a request cancellation process and re-request processing.

Next, the request cancellation process will be described.

Figure 13:
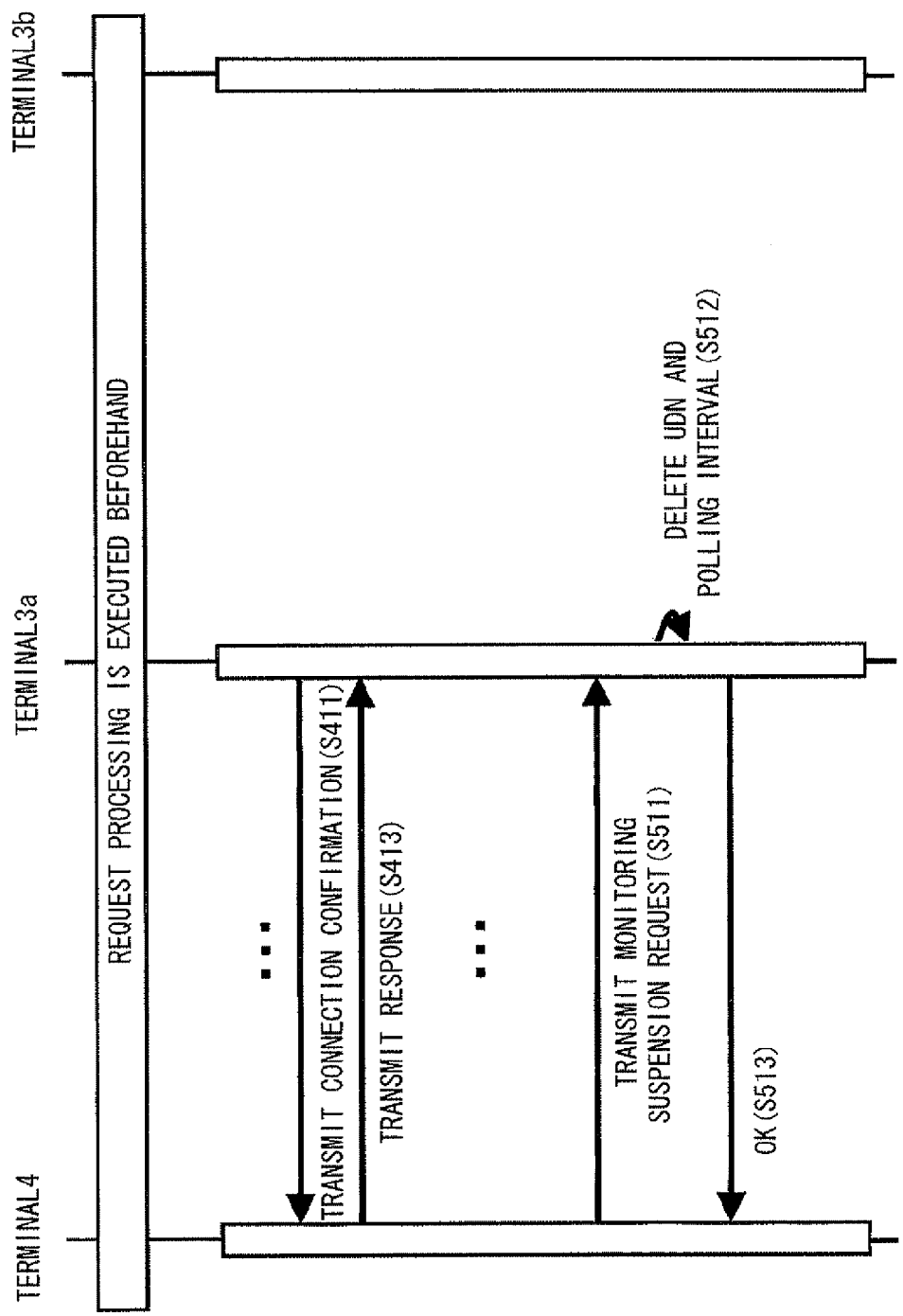
FIG. 13 is a sequence diagram showing an example of a request cancellation process according to Embodiment 1.

FIG. 13 is a sequence diagram showing an example of the request cancellation process according to the embodiment. FIG. 13 shows a state where the example of the monitoring process described above is being executed. If the request unit 51 of the radio UPnP terminal 4 has decided that the monitoring process is unnecessary, in the state of the repetition of the process operations S411 and S413 (a second condition), it transmits a monitoring suspension request for suspending the request for the monitoring, to the UPnP terminal with the monitoring function, 3*a* (S511). The "case where the monitoring is unnecessary" is, for example, a case where the communications of the radio UPnP terminal 4 have become stable, so the possibility of the detachment of this radio UPnP terminal 4 from the network 1 has become low. The UPnP terminal with the monitoring function, 3*a* having received the monitoring suspension request deletes the UDN and polling interval of the terminal to-be-monitored from the control information storage unit 42 (S512) and transmits a response indicating OK, to the radio UPnP terminal 4 (S513), whereupon the request cancellation process and the monitoring process are ended.

In accordance with the request cancellation process described above, the monitoring process can be ended if the communications of the radio UPnP terminal 4 have changed from an unstable state into a stable state. It is accordingly possible to prevent the load of the network 1 and the power consumption of the radio UPnP terminal 4 as are wasteful.

Next, the re-request processing will be described.

Figure 14:
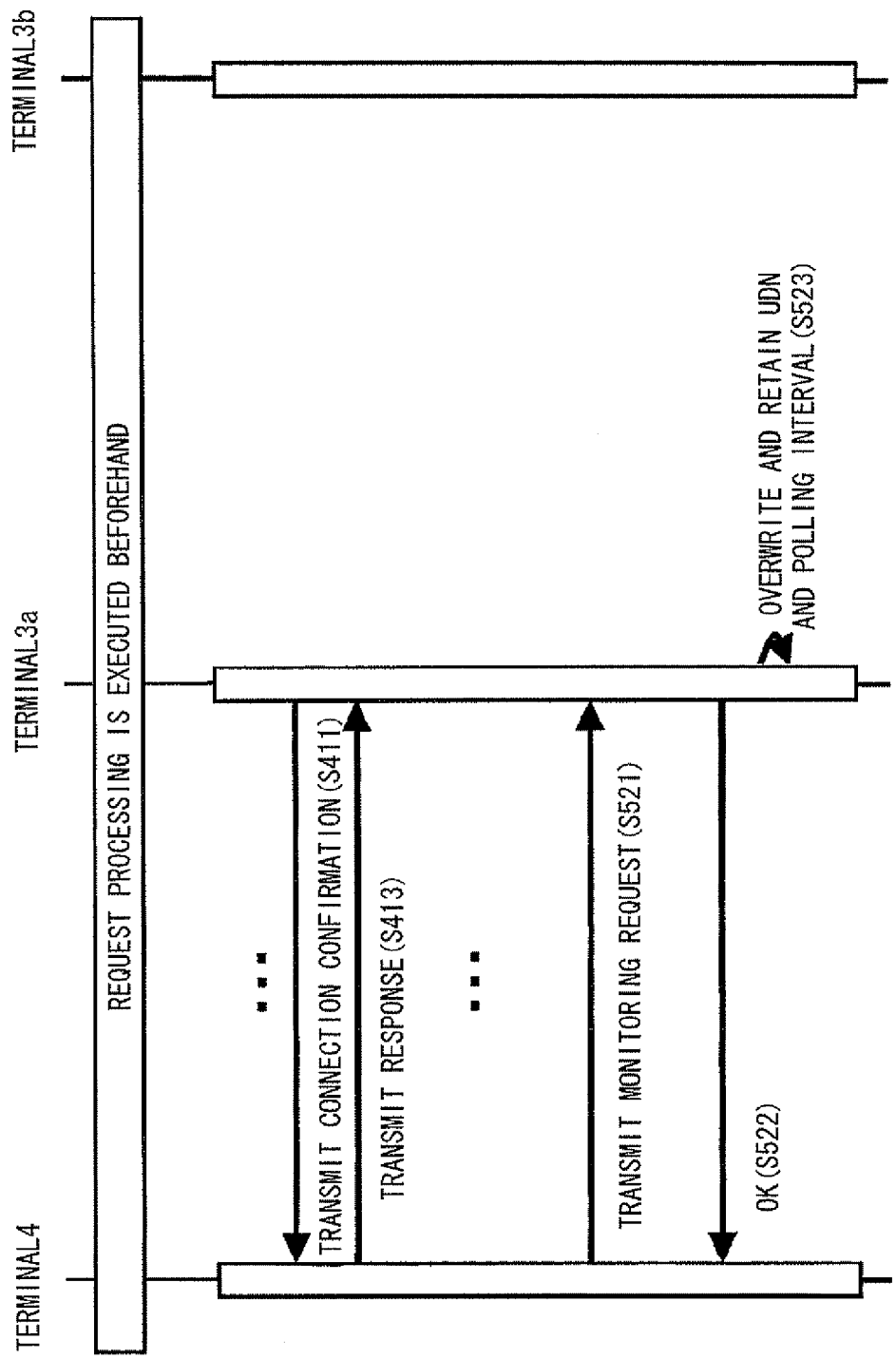
FIG. 14 is a sequence diagram showing an example of re-request processing according to Embodiment 1.

FIG. 14 is a sequence diagram showing an example of the re-request processing according to the embodiment. FIG. 14 shows a state where the example of the monitoring process described above is being executed. If the request unit 51 of the radio UPnP terminal 4 has decided that the polling interval is to be altered, in the state of the repetition of the process operations S411 and S413 (if a predetermined change has occurred in the state of the pertinent station), it executes a process similar to the request processing. Here, the request unit 51 acquires the state of the radio UPnP terminal 4 periodically, and it alters the polling interval to be shorter as the communications become more unstable, whereas it alters the polling interval to be longer as the communications become more stable. By way of example, a plurality of ranges are set for a radio wave intensity beforehand, and polling intervals corresponding to the respective ranges are set.

The request unit 51 having altered the polling interval transmits the monitoring request containing the UDN and a new polling interval, to the UPnP terminal with the monitoring function, 3a (S521), and the UPnP terminal with the monitoring function, 3a having received the monitoring request transmits a response indicating OK, to the radio UPnP terminal 4 (S522) and overwrites and retains the UDN and the new polling interval contained in the monitoring request, in the control information storage unit 42 (S523). Thenceforth, the UPnP terminal with the monitoring function, 3a performs the connection confirmation with the new polling interval in the monitoring process.

In accordance with the re-request processing described above, the polling interval can be changed in correspondence with the state of the radio UPnP terminal 4. Accordingly, in the case where the radio UPnP terminal 4 exhibits the low possibility of the detachment from the network 1, the polling interval is lengthened more, whereby the load of the network 1 and the power consumption of the radio UPnP terminal 4 can be suppressed, and in the case where the radio UPnP terminal 4 exhibits the high possibility of the detachment from the network 1, the polling interval is shortened more, whereby any other terminal on the network 1 can promptly recognize the detachment of the radio UPnP terminal 4.

Incidentally, it has been assumed in the above request processing and re-request processing that the radio UPnP terminal 4 contains the polling interval in the monitoring request, and that the representative terminal transmits the connection confirmation at the polling interval. It is also allowed, however, that the radio UPnP terminal 4 contains a parameter expressing the state of this radio UPnP terminal 4, in the monitoring request, and that the representative terminal determines the polling interval in accordance with the parameter.

Embodiment 2

In this embodiment, there will be described a case where a representative terminal is determined at the time of a monitoring request.

First, the configuration of an UPnP communication system according to the embodiment will be described.

Figure 15:
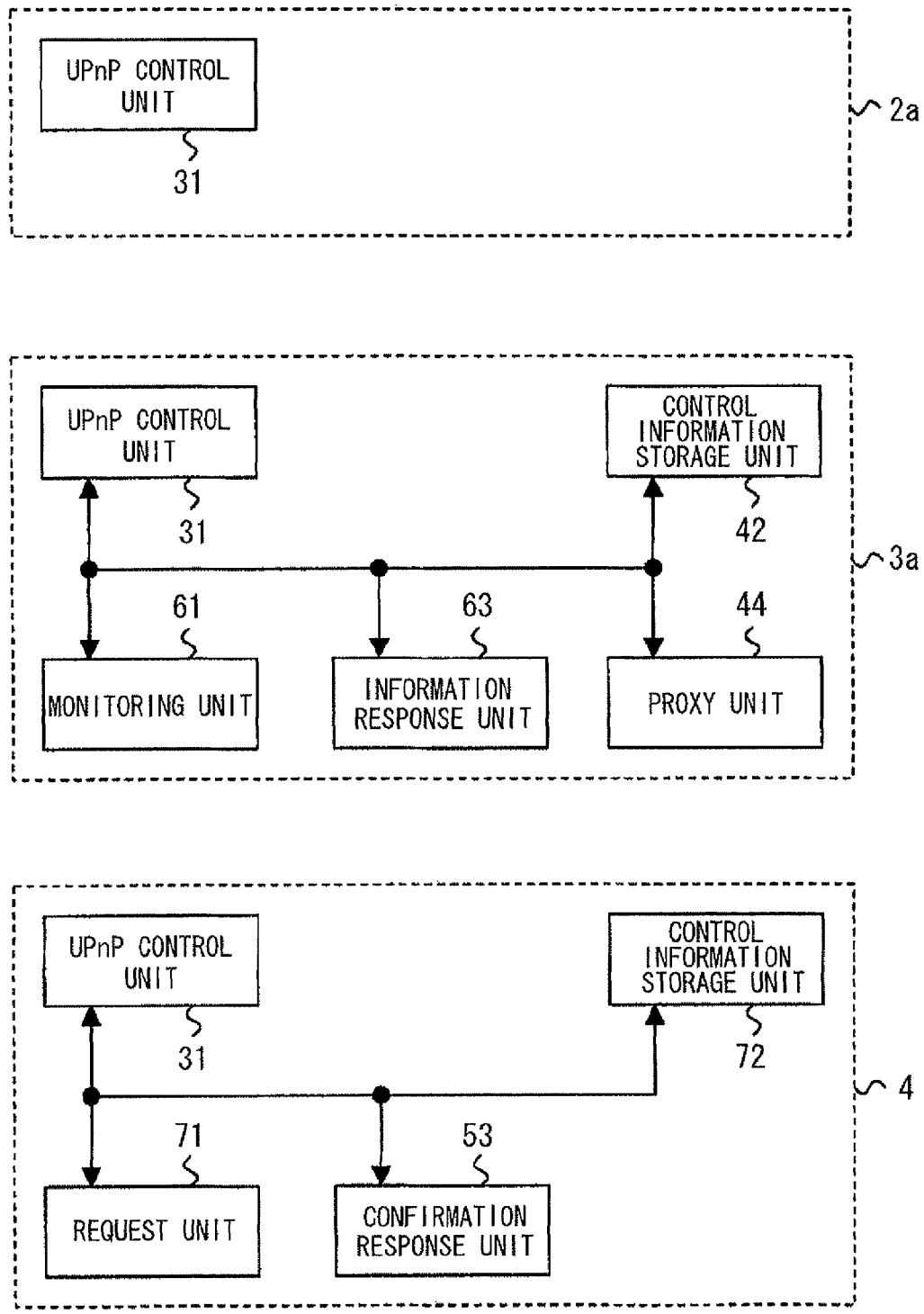
FIG. 15 is a block diagram showing an example of the software configurations of UPnP terminals according to Embodiment 2.

The configuration of the UPnP communication system and the hardware configurations of UPnP terminals 2a and 2b, UPnP terminals with a monitoring function, 3a, 3b and 3c and a radio UPnP terminal 4 according to the embodiment are the same as those in Embodiment 1. FIG. 15 is a block diagram showing an example of the software configurations of the UPnP terminals according to this embodiment. When FIG. 15 is compared with FIG. 3, each of the UPnP terminals with the monitoring function, 3a, 3b and 3c in Embodiment 2 includes a monitoring unit 61 instead of the monitoring unit 41, and it includes an information response unit 63 instead of the negotiation unit 43. Besides, the radio UPnP terminal 4 in Embodiment 2 includes a request unit 71 instead of the request unit 51, and it includes a control information storage unit 72 anew.

Next, the operation of the UPnP communication system according to the embodiment will be described.

When the radio UPnP terminal 4 has become unstable in its communications with a network 1, it executes request processing for requesting the UPnP terminals with the monitoring function, 3a, 3b and 3c to monitor the terminal 4 itself. In the request processing, the radio UPnP terminal 4 determines a representative terminal, and it request the representative terminal to monitor itself. Accordingly, a representation right negotiation process is not executed. The monitoring process is the same as in Embodiment 1.

Next, the request processing will be described.

FIG. 16 is a sequence diagram showing an example of the request processing according to the embodiment. FIG. 16 shows the operations of the radio UPnP terminal 4 and the UPnP terminals with the monitoring function, 3a and 3b. Here, it is assumed that the UPnP terminal with the monitoring function, 3a is higher in stability than the UPnP terminal with the monitoring function, 3b. First, the request unit 71 of the radio UPnP terminal 4 decides whether or not monitoring is necessary, similarly to the process operation S311 (S611). Subject to the decision that the monitoring is necessary, the request unit 71 transmits a stability request for making a request for the stabilities of the UPnP terminals with the monitoring function, 3a and 3b, to the network 1 by broadcasting (S612). Subsequently, the request unit 71 decides time-out (S613). Here, when the request unit 71 does not receive a response before the lapse of a predetermined time-out time period since the transmission of the stability request, it decides the time-out and ends the request processing.

Here, it is assumed that the UPnP terminals with the monitoring function, 3a and 3b have received the monitoring request. First, the monitoring unit 61 of the UPnP terminal with the monitoring function, 3a transmits the stability information thereof retained in the control information storage unit 42, as the response, to the radio UPnP terminal 4 (S614). If the stability information is not retained in the control information storage unit 72 of the radio UPnP terminal 4 having received the response, the request unit 71 thereof retains the stability information and the IP address of the transmission source of the response as are contained in the response, in the control information storage unit 72 (S615).

Likewise, the information response unit 63 of the UPnP terminal with the monitoring function, 3b transmits the stability information thereof retained in the control information storage unit 42, as the response, to the radio UPnP terminal 4 (S616). The request unit 71 of the radio UPnP terminal 4 having received the response executes a stability information comparison process which compares stability information retained in the control information storage unit 72 and the stability information contained in the response. Only in case of the decision that the stability of the terminal having responded is higher, the request unit 71 retains the stability information and the IP address of the transmission source of the response as are contained in the response, in the control information storage unit 72. Here, since the stability of the UPnP terminal with the monitoring function, 3a is higher, the request unit 71 does not retain the stability information and the IP address (S617).

Subsequently, the request unit 71 transmits the monitoring request to the IP address retained in the control information storage unit 72 (S621). That is, the UPnP terminal with the monitoring function, 3a being the terminal which has the IP address retained in the control information storage unit 72 becomes the representative terminal. In the same manner as in Embodiment 1, the monitoring request contains the UDN of the radio UPnP terminal 4 and a polling interval. The monitoring unit 61 of the UPnP terminal with the monitoring function, 3a having received the monitoring request transmits a response indicating OK, to the radio UPnP terminal 4 (S622) and retains the UDN and polling interval contained in the monitoring request, in the control information storage unit 42 (S623), whereupon the request processing is ended.

In accordance with the request processing described above, the radio UPnP terminal 4 determines the representative terminal at the time of the monitoring request, whereby the representative terminal can be selected from the latest stability information items of the UPnP terminals with the monitoring function. Besides, communications for the representation right negotiation process need not be performed beforehand.

In accordance with each of the foregoing embodiments, while a load on any UPnP terminal on the network 1 is suppressed to the minimum, any other UPnP terminal can promptly recognize the detachment of the radio UPnP terminal 4. Accordingly, even when the UPnP equipment is battery-driven, decrease in the operating time period thereof can be suppressed.

Incidentally, in the claims of a communication apparatus control program which causes a computer to execute a reception operation, a first transmission operation and a second transmission operation, and the claims of a communication apparatus which includes a reception portion, a first transmission portion and a second transmission portion, a "pertinent station" corresponds to the UPnP terminal with the monitoring function, in each embodiment, and a "station to-be-handled" corresponds to the radio UPnP terminal.

Besides, in the claims of a communication apparatus control program which causes a computer to execute a third transmission operation and a fourth transmission operation, and a communication apparatus which includes a third transmission portion and a fourth transmission portion, a "pertinent station" corresponds to the radio UPnP terminal in each embodiment, and a "monitoring station" and a "candidate station" correspond to the UPnP terminals with the monitoring function.

Besides, the "reception operation" corresponds to the process operation S312 or S621 in each embodiment. Besides, the "first transmission operation" corresponds to the process operation S411 in each embodiment. Further, the "second transmission operation" corresponds to the process operation S415 in each embodiment. Still further, a "first acquisition operation" corresponds to the stability negotiation process in each embodiment. Yet further, a "decision operation" corresponds to the stability comparison process in each embodiment. In addition, the "third transmission operation" corresponds to the process operation S312 or S621 in each embodiment. Still in addition, the "fourth transmission operation" corresponds to the process operation S413 in each embodiment. Yet in addition, a "fifth transmission operation" corresponds to the process operation S511 in each embodiment. Further, a "sixth transmission operation" corresponds to the process operation S521 in each embodiment. Still further, a "second acquisition operation" corresponds to the process operation S612 in each embodiment.

Besides, the "reception portion" corresponds to the process operation S312 or S621 based on the negotiation unit in each embodiment. Besides, the "first transmission portion" corresponds to the monitoring unit in each embodiment. Further, the "second transmission portion" corresponds to the proxy unit in each embodiment. Still further, a "first acquisition portion" corresponds to the stability negotiation process based on the negotiation unit in each embodiment. Yet further, a "decision portion" corresponds to the stability comparison process based on the negotiation unit in each embodiment. Yet further, the "third transmission portion" corresponds to the request unit in each embodiment. In addition, the "fourth transmission portion" corresponds to the confirmation response unit in each embodiment.

Besides, the communication apparatus according to each embodiment can be readily applied to an information process apparatus, and it can enhance the performance of the information process apparatus more. Here, the "information process apparatus" can cover, for example, a server, a PC (Personal Computer), a PDA (Personal Digital Assistant) and a portable telephone.

Further, a program which causes a computer constituting the communication apparatus, to execute the operations described above can be provided as a communication apparatus control program. The program can be run by the computer constituting the communication apparatus, when stored in a computer-readable recording medium. Here, the computer-readable recording medium covers a ROM, a RAM or the like internal storage device which is installed in the computer; a CD-ROM, a flexible disk, a DVD disk, a magneto optic disk, an IC card or the like portable storage medium; a database which retains computer programs; another computer and its database; and so forth.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-transitory recording medium bearing a program which causes a computer to perform a control comprising:
   receiving a request for monitoring a station to-be-handled which is a communication apparatus different from a pertinent station including the computer, the monitoring request containing a bandwidth parameter expressing a state of the station to-be-handled;
   transmitting a request for a response based on the station to-be-handled, to the station to-be-handled at a predetermined time interval, on the basis of the monitoring request, the predetermined time interval being determined in accordance with the bandwidth parameter; and
   transmitting a message expressing that the station to-be-handled will be detached from a network to the network if the response to the response request was not received within a predetermined wait time; and
   acquiring aptitude information which is information expressing an aptitude to the monitoring based on the pertinent station, before receiving the request.

2. A non-transitory recording medium bearing a program which causes a computer to perform a control as defined in claim 1, wherein:
   receiving the request for monitoring the station to-be-handled which is the communication apparatus different from the pertinent station comprises further receiving an aptitude information of another station, the another communication apparatus being different from the pertinent station.

3. A non-transitory recording medium bearing a program which causes a computer to perform a control as defined in claim 1, wherein:
   the aptitude information of the pertinent station is transmitted to an other station if the request for the aptitude information has been received from the other station, the other communication apparatus being different from the pertinent station.

4. A non-transitory recording medium bearing a program which causes a computer to perform a control as defined in claim 1, wherein:
   the aptitude information of the communication apparatus contains at least one member selected from the group consisting of a power supply for driving the communication apparatus, a remaining capacity of a battery for driving the communication apparatus, a network interface of the communication apparatus, a radio wave intensity received or transmitted by the communication apparatus, a processing capability of the communication apparatus, and a storage capacity of the communication apparatus.

5. A non-transitory recording medium bearing a program which causes a computer to perform a control as defined in claim 1, further comprising:

deciding whether or not the pertinent station is qualified for the monitoring, on the basis of the aptitude information of the pertinent station and the aptitude information of the other station, before the first acquiring aptitude information and receiving the request;

wherein the first transmitting is executed if it has been decided by the deciding that the pertinent station is qualified for the monitoring.

6. A communication apparatus which is connectable to a network, comprising:

a reception portion which receives a request for monitoring a station to-be-handled being a communication apparatus that is different from a pertinent station being the connectable communication apparatus, the monitoring request containing a bandwidth parameter expressing a state of the station to-be-handled;

a first transmission portion which transmits a request for a response based on the station to-be-handled, to the station to-be-handled at a predetermined time interval, on the basis of the monitoring request, the predetermined time interval being determined in accordance with the bandwidth parameter; and a second transmission portion which transmits a message expressing that the station to-be-handled will be detached from the network, to the network if the response to the response request was not received within a predetermined wait time; and a first acquisition portion which acquires aptitude information being information that expresses an aptitude to the monitoring based on the pertinent station.

7. A control method in which a computer performs a control comprising:

receiving a request for monitoring a station to-be-handled which is a communication apparatus different from a pertinent station including the computer, the monitoring request containing a bandwidth parameter expressing a state of the station to-be-handled;

transmitting a request for a response based on the station to-be-handled, to the station to-be-handled at a predetermined time interval, on the basis of the monitoring request, the predetermined time interval being determined in accordance with the bandwidth parameter; and transmitting a message expressing that the station to-be-handled will be detached from a network, to the network if the response to the response request was not received within a predetermined wait time; and acquiring aptitude information which is information expressing an aptitude to the monitoring based on the pertinent station, before receiving the request.

* * * * *